United States Patent
Elhaus

(10) Patent No.: US 8,210,082 B2
(45) Date of Patent: Jul. 3, 2012

(54) SAWING APPARATUS

(75) Inventor: Uwe Elhaus, Calw (DE)

(73) Assignee: Holzma Plattenaufeil Technik GmbH, Calw-Holzbronn (DE)

( * ) Notice: Subject to any disclaimer, the term of this patent is extended or adjusted under 35 U.S.C. 154(b) by 90 days.

(21) Appl. No.: 12/206,280

(22) Filed: Sep. 8, 2008

(65) Prior Publication Data

US 2009/0044680 A1    Feb. 19, 2009

Related U.S. Application Data

(63) Continuation of application No. PCT/EP2007/000366, filed on Jan. 17, 2007.

(51) Int. Cl.
*B26D 3/06* (2006.01)

(52) U.S. Cl. .......................................... 83/863; 83/471

(58) Field of Classification Search .............. 83/72, 73, 83/863, 358, 368, 471, 477.1
See application file for complete search history.

(56) References Cited

U.S. PATENT DOCUMENTS

| | | | | |
|---|---|---|---|---|
| 4,663,721 A | * | 5/1987 | Herscovici | 700/160 |
| 4,706,535 A | * | 11/1987 | Ducharme | 83/863 |
| 6,031,200 A | * | 2/2000 | Whitehouse | 219/121.67 |
| 6,422,227 B1 | | 7/2002 | Kobayashi | |
| 7,240,598 B2 | * | 7/2007 | Wang | 83/863 |

FOREIGN PATENT DOCUMENTS

| | | |
|---|---|---|
| DE | 195 20 108 A1 | 1/1996 |
| DE | 103 35 062 A1 | 4/2005 |

OTHER PUBLICATIONS

International Search Report from PCT/EP2007/000366.

* cited by examiner

*Primary Examiner* — Sean Michalski

(74) *Attorney, Agent, or Firm* — Brinks Hofer Gilson & Lione

(57) ABSTRACT

A sawing apparatus includes a separating saw blade of a separating saw and a scorer blade of a scorer. Through an adjusting device, the position of the scorer blade can be adjusted transversely in relation to a sawing direction. The sawing apparatus has a sensing device which can sense the relative position of a scoring groove of the scorer blade on a workpiece with respect to a separating groove of the separating saw blade, and/or the quality of the separating groove.

12 Claims, 4 Drawing Sheets

SAWING APPARATUS

CROSS-REFERENCE TO RELATED APPLICATIONS

This application is a continuation of International Application No. PCT/EP2007/000366 filed on Jan. 17, 2007, which claims the benefit of DE 10 2006 011 131.1-14, filed Mar. 10, 2006. The disclosures of the above applications are incorporated herein by reference.

FIELD

The present disclosure relates to a sawing device.

BACKGROUND

The statements in this section merely provide background information related to the present disclosure and may not constitute prior art.

Known from the market are sawing devices having a cutoff saw and a scorer. With such a scorer, a scoring groove is emplaced in the region of the surface of a plate-shaped workpiece, however, it does not sever the workpiece. The actual cutting process is performed by the cutoff saw. The width of the scoring groove is typically equal to the width of the cutoff saw, or it is slightly larger (max. 0.1 mm) than the width of the separating groove. The scorer prevents the workpiece surface from tearing during the actual cutting operation with the cutoff saw. This applies particularly to workpieces having a surface coating. Also known are scorers having a conical scoring blade, in which the width of the scoring groove is adjusted via the depth of the blade.

For the production of the scoring groove, it is important that it is aligned with the subsequently produced separating groove as exactly as possible. Therefore, it is proposed in DE 195 20 108 A1, during the start of a sawing operation, to measure a cutoff saw blade of the cutoff saw and a scorer blade of the scorer by means of sensors and to adjust the position of the scorer blade in relation to the cutoff saw blade, depending on the measurement result. However, this known device has the disadvantage that it is very complex and that the result of the work, which is to say the alignment between the scoring groove and separating groove, is frequently not guaranteed.

It is therefore a task of the present disclosure to create a sawing device which has a simple design and with which good and satisfactory results can be achieved on the workpiece to be processed.

SUMMARY

This task is achieved by a sawing device having the characteristics of claim 1. Advantageous embodiments of the present disclosure are disclosed in the dependent claims. Characteristics of the present disclosure are furthermore provided in the following description and the drawing, whereby these characteristics can be employed alone or in different combinations, without explicitly pointing this out in the individual case.

With the sawing device according to the present disclosure, a complex measurement of the cutoff saw blade and the scorer blade is avoided. Instead, the work result of the cutoff saw and scorer is merely acquired, which is to say the relative position of the scoring groove, that is produced by the scorer on the workpiece, in relation to the actual separating groove, which is produced by the cutoff saw and ultimately causes the separation of the workpiece, or the quality of the separating groove. A method according to the present disclosure, however, can likewise be used, if no complete groove is produced, which is to say a groove extending across the entire thickness of the workpiece, but instead only a groove extending over a part of the thickness of the workpiece, in the case of the scorer, a scoring groove, and in the case of the cutoff saw, a separating groove. The adjustment of the scorer is thus independent of the actual geometry and the wear state of the cutoff saw and scorer, so that the adjustment can be performed at any time and with improved results. In addition, the acquisition, or the "measuring", of the scoring groove and separating groove, or scoring channel and separating channel, is very simple, as these have a much simpler geometry than the scorer and cutoff saw blades measured according to the state of the art.

An advantageous refinement of the present disclosure is that this acquisition device comprises image capturing. Such image capturing typically uses a CCD sensor and associated optics and also signal evaluation electronics. In the simplest case, a commercially available video camera, a webcam or a digital camera can be used for image capturing. Such an acquisition device is inexpensive and, for example, can also be easily retrofitted on existing sawing devices.

Alternatively, the acquisition device may also comprise a laser scanning device. This can be used to reliably measure even more complex workpieces having a surface that is less suited for image capturing. Similar circumstances apply to an acquisition device which comprises an ultrasonic scanning device.

In one form, a monitor is provided with the sawing device, on which the relative position of the scoring groove, or of the scoring groove in relation to the separating groove, or of the separating groove, can be visualized. When using an image detection system, the monitor can simply transmit the image of the video camera, and the image is then evaluated by the operator. However, it is also possible to alternatively, or additionally, display numerical data on the monitor which characterizes the relative position of the scoring groove, or of the scoring groove in relation to the separating groove, or of the separating groove.

It is particularly advantageous to configure the adjusting device such that it can be remotely controlled, since in this case the adjustment of the scorer saw can be performed quickly because the operator can save the way to, and the manual adjustment of, the scorer. In a variation thereof, it is proposed that the sawing device has a controller which automatically adjusts the acquired actual relative position to a target relative position. In this way it is ensured that the sawing device is always optimally adjusted, regardless of the operator of the sawing device. Optionally, it is even conceivable that the adjustment of the scorer saw is performed not (only) as part of test cuts, but during the production of the actual workpiece at defined intervals, or continuously, so that wear occurring over time is counteracted at regular intervals, or continuously.

The sawing device according to the present disclosure is relatively inexpensive, if the cutoff saw and/or the scorer and the capturing device are positioned on a common traveler. A greater flexibility during operation, however, is attained by a device, in which the acquisition device is disposed on a separate, displaceable cart.

In order to acquire the relative position of the scoring groove, or of the scoring groove in relation to the separating groove, or of the separating groove, the measurement of the workpiece can occur in a plane orthogonal to the sawing direction. In this way, a "cut view" of the workpiece is obtained, and thereby also information regarding the depth of the scoring groove or scoring channel that is introduced, thus also enabling an adjustment in this direction. A capturing device that captures a top view of the workpiece to be processed in the region of the scoring groove, or scoring groove and separating groove, or separating groove, is, however, simpler.

In the context of the present invention, the acquisition device may encompass an evaluation device which evaluates the quality of the separating groove or separating channel, in particular, existing stripping and/or undulated cuts. In this way, the acquisition device envisioned according to the invention is also used in a reliable and simple manner for the quality control of the separating cut which allows further improvement of the work quality of the sawing device without high additional expense.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
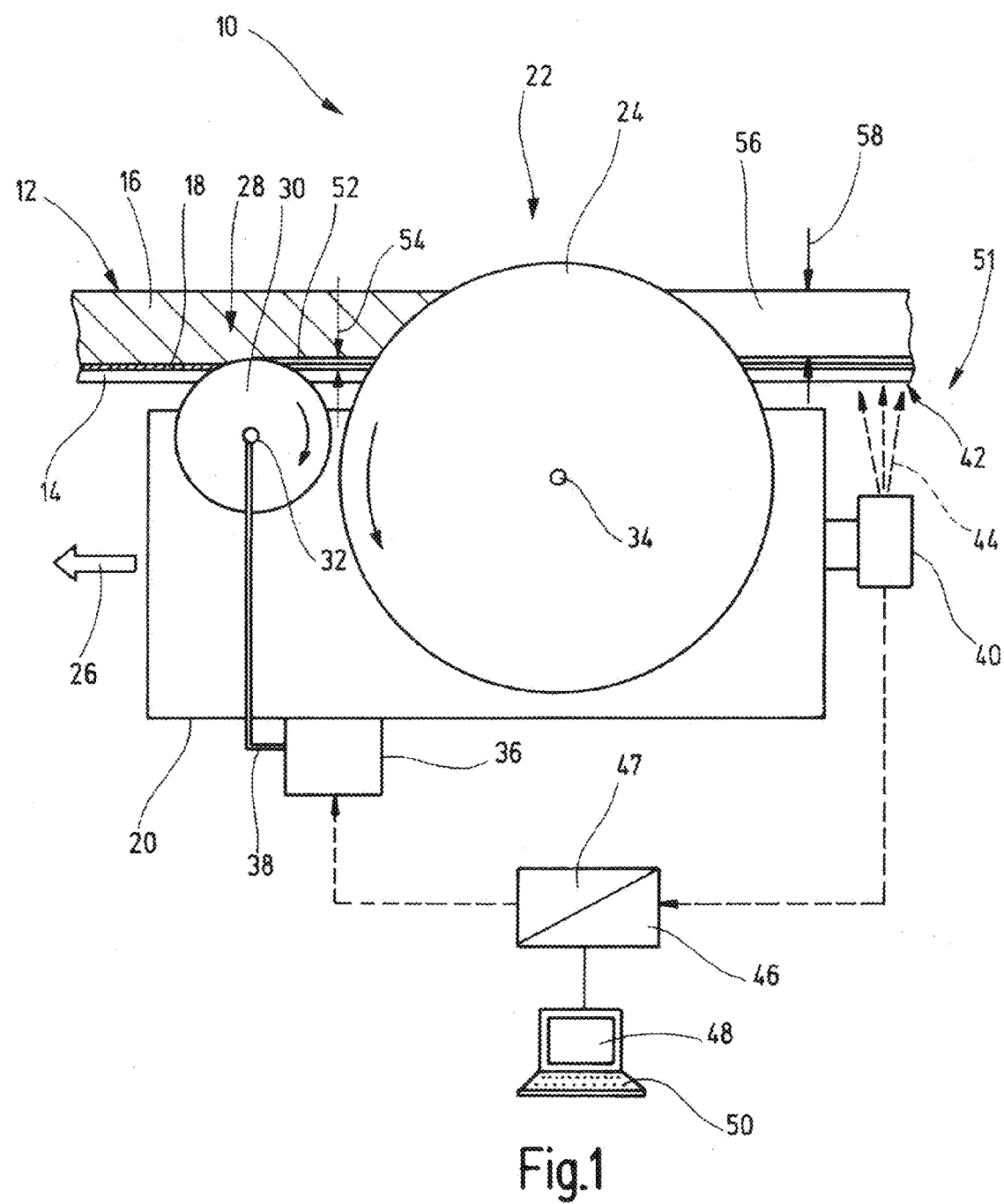
FIG. 1 is a side view of a sawing device comprising a cutoff saw, a scorer and a capturing device for adjusting a scorer blade and a cut through a workpiece being processed.

A sawing device is denoted in FIG. 1 with the reference numeral 10. It is used to saw a workpiece 12 and includes a workpiece table 14 on which the workpiece 12 rests. In the present case, the workpiece comprises a particle board 16 having a surface coating 18, with which it rests on the workpiece table 14.

The sawing device 10 further comprises a traveler 20, to which a cutoff saw 22 having a cutoff saw blade 24 is fastened. During a sawing operation, the traveler 20 can be moved in the advancement direction (arrow 26). Viewed in the advancement direction 26, a scorer 28 comprising a scorer blade 30 is fastened to the traveler 20 in front of the cutoff saw 22. In the present embodiment, the scorer blade 30 is driven clockwise about an axis 32, while the cutoff saw blade 24 in the present case is driven counterclockwise about an axis 34.

Also provided on the traveler 20 is an electric adjusting device 36 which can be used, as is indicated by a double line 38, to adjust the scorer blade 30 perpendicular to the blade plane of FIG. 1. Furthermore, the traveler 20 is provided with a video camera 40 which, viewed in the advancement direction 26, is directed at a cutting region 42 of the workpiece 12 located directly behind the cutoff saw 22, that is indicated by the sight arrows 44. Instead of a video camera, a laser scanning device or an ultrasonic scanning device may also be used.

The video camera 40 supplies appropriate signals to an evaluation device 46 and a controller 47, which is in turn connected to a monitor 48 and an input device 50 of a computer. The video camera 40, the evaluation unit 46 with the associated controller 47, the monitor 48 and the input unit 50 together form an acquisition device 51, which, as will be explained in detail below, acquires the relative position of a scoring groove of the scorer blade 30 in relation to a separating groove of the cutoff saw blade 24 on the processed workpiece 12. The controller 47 in turn controls the adjusting device 36.

During operation, the scorer 28 with the scorer blade 30 first makes a scoring groove 52 in the workpiece 12, the depth 54 of the groove being slightly larger than the thickness of the surface coating 18 of the workpiece 12. Then, the cutoff saw blade 24 of the cutoff saw 22 performs the actual separating cut, wherein an additional separating groove 56 extending from the scoring groove 52 and having a depth 58 is sawed into the workpiece 12.

Figure 2:
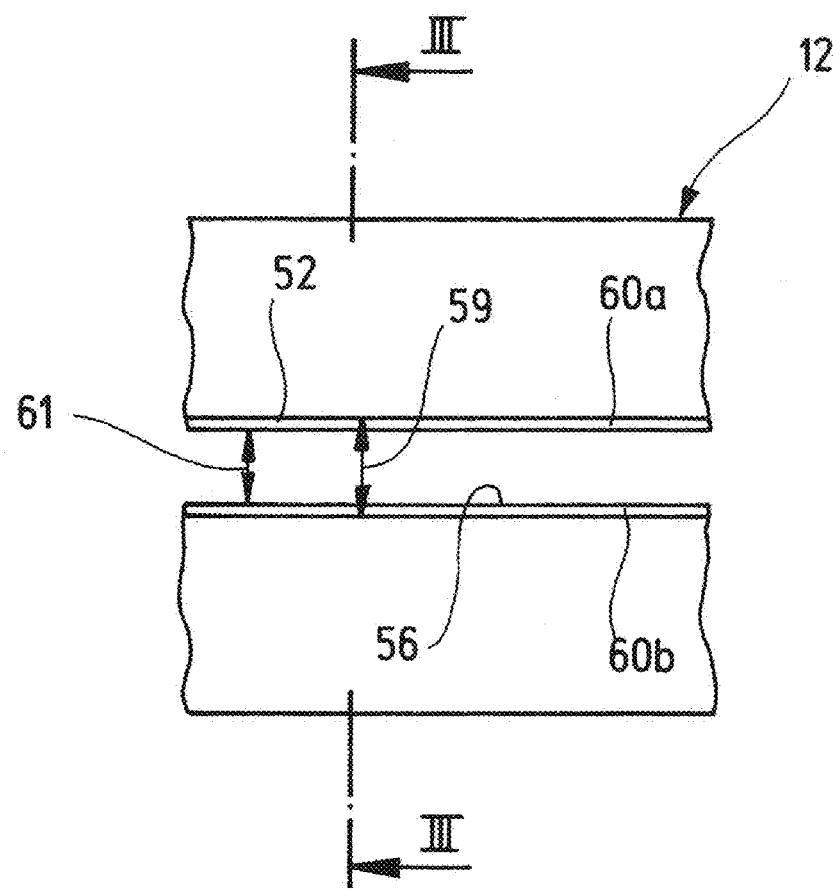
FIG. 2 is a top view of a scoring groove and a separating joint in the workpiece according to FIG. 1.
Figure 3:
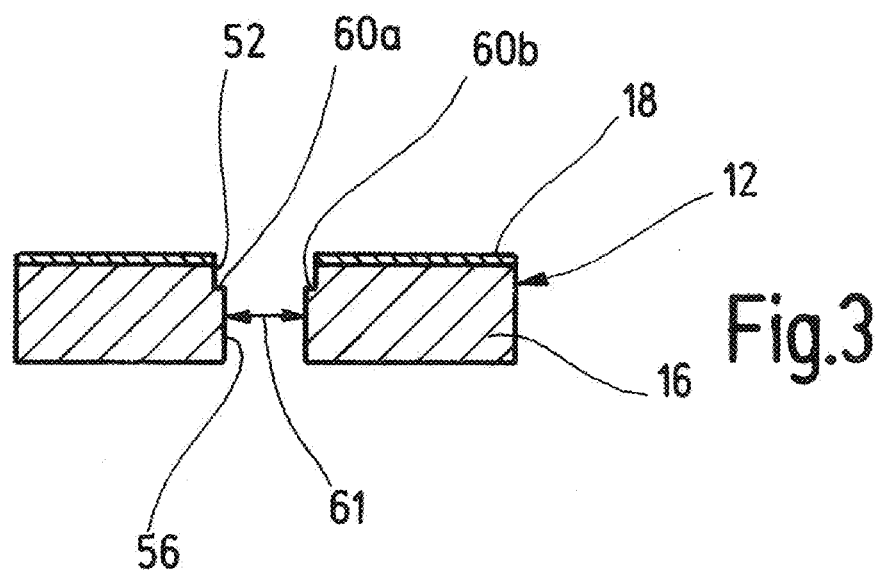
FIG. 3 is a sectional view along the line III/III according to FIG. 2.
Figure 4:
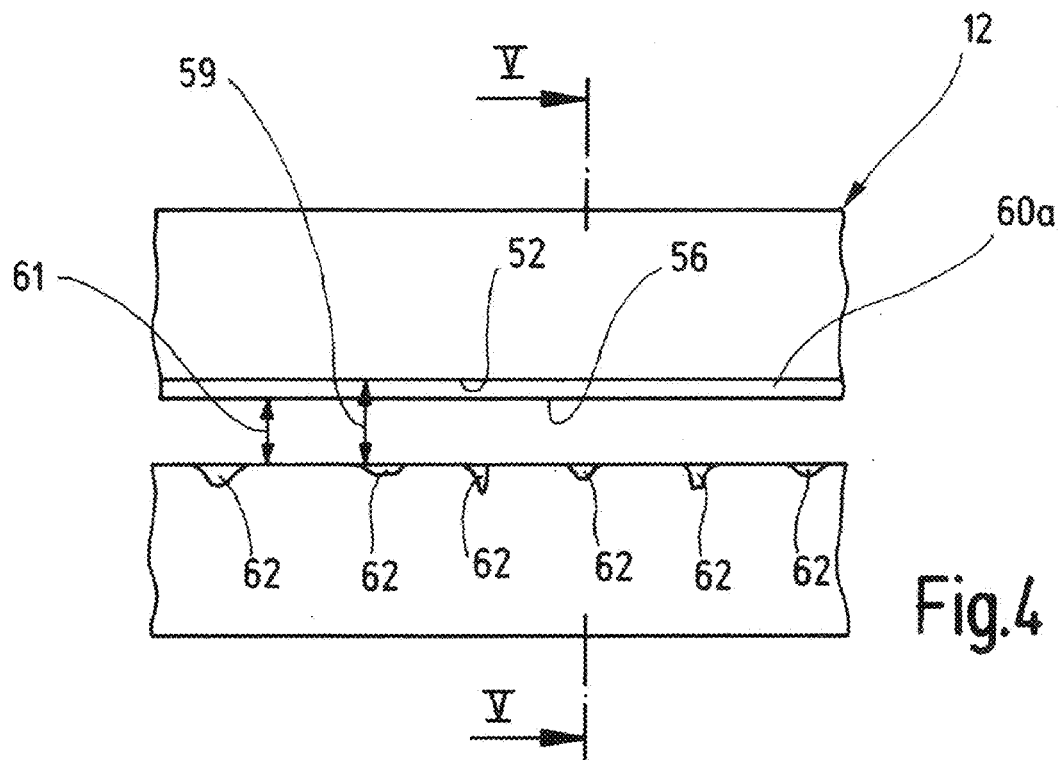
FIG. 4 is an illustration similar to FIG. 2 with a scorer blade out of alignment.
Figure 5:
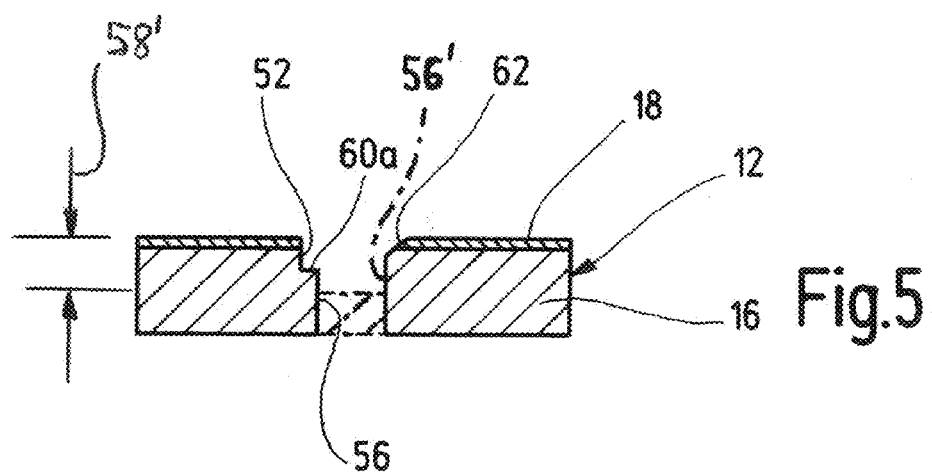
FIG. 5 is an illustration similar to FIG. 3 with a scorer blade out of alignment.

As is apparent from FIG. 2, the scoring groove 52 is typically slightly wider (arrow 59) than the separating groove 56 (width 61), with a uniformly large protrusion 60a or 60b on either side. A cut through the processed workpiece 12 in a plane that is orthogonal to the sawing or advancement direction 26 is shown in FIG. 3. If the scorer blade 30 of the scorer 28 is out of alignment in relation to the cutoff saw blade 24 of the cutoff saw 22, the cut view shown in FIGS. 4 and 5 can be the result. Here, the scoring groove 52 is not aligned with the separating groove 56, but one side has a large protrusion 60a, while the other side has no protrusion at all. When producing the separating groove 56, this results in stripping 62, particularly in the region of the surface coating 18 on the workpiece 12.

In order to prevent such stripping 62, it is important that the scoring groove 52 is aligned with the separating groove 56 and that both sides of the scoring groove 52 in relation to the separating groove 56 have a certain protrusion 60a and 60b, as is shown in FIGS. 2 and 3. Since scorer blades, however, have tolerances, the scorer blade 30 must be realigned in relation to the cutoff saw blade 24 in a direction perpendicular to the blade plane of FIG. 1, for example following a tool change, so that the scoring groove 52 is aligned with the separating groove 56. As a result, the video camera 40 aims at the cutting region 42 directly behind the cutoff saw 22. The line of sight of the video camera 40 is located approximately in a center plane of the cutoff saw blade 24.

If the scorer blade 30 is adjusted in relation to the cutoff saw blade 24 such that the corresponding scoring groove 52 is aligned with the separating groove 56, the video camera 40, for example, is provided with the image shown in FIG. 2, which is also displayed on the monitor 48. If the scorer blade 30 is out of alignment, however, the video camera 40, for example, is provided with the image shown in FIG. 4. In this case, the evaluation device 46 recognizes that the protrusion 60a is significantly larger than the protrusion 60b, which in the present embodiment is close to zero. The video camera 40 and the evaluation unit 46 thus form an image detection device, which acquires or detects an actual relative position of the scoring groove 52 in relation to the separating groove 56.

Starting from the detected actual relative position of the scoring groove 52 in relation to the separating groove 56, the adjusting device 36 is controlled via the controller 46 such that the scoring groove 52 is again aligned with the separating groove 56, in accordance with the illustration from FIG. 2. The image detection device, which is formed by the video camera 40 and the evaluation unit 46, however, not only recognizes whether the scoring groove 52 is aligned relative to the separating groove 56, but it also detects stripping 62 (or undulated cuts, which are not shown in the figure) and monitors the development of the same while the scoring groove 52 and separating grove 56 are produced. For example, the size and quantity of stripping 62 per unit of length are detected, which enables a quantifiable quality assessment of the results on the workpiece 12. It is also possible that the controller 46 adjusts the actual relative position such that the size and number of stripping 62 are minimized.

In an embodiment, which is not shown, instead of a video camera a laser scanning device or an ultrasonic scanning device is used. With these two scanning devices, it is possible to acquire a cut view in a plane orthogonal to the cutting direction 26 or to acquire the scoring groove 52 and the separating groove 56 in a profile view, according to the illustrations in FIGS. 3 and 5.

Figure 6:
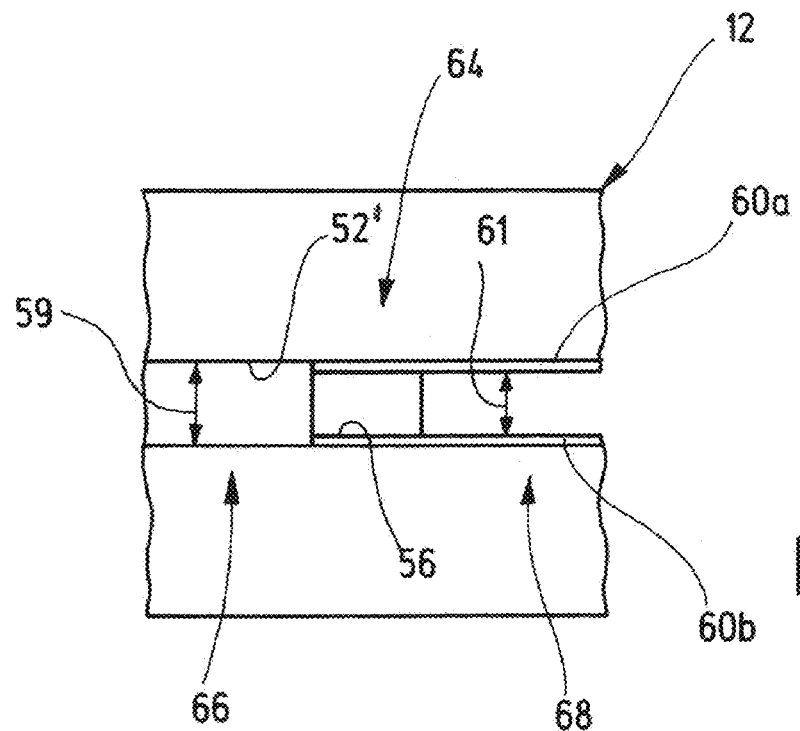
FIG. 6 is an illustration similar to FIG. 2 of a boundary region between the scoring groove and separating groove.

If a video camera or a laser scanning device is used, as is the case in FIG. 1 in accordance with reference numeral 40, according to FIG. 6 the relative position of the scoring groove 52' to the separating groove 56 can also occur in a "non-continuous" method. In this case, the cutoff saw blade 24 and the scorer blade 30 are pulled out of the workpiece 12 in the blade plane according to FIG. 1 even before the workpiece 12 is fully severed. Then the traveler 20 is moved such that the video camera 40 is aimed precisely at a boundary region 64, which is located between a region 66 in which only the scoring groove 52' is present and a region 68 in which the separating groove 56 is completely introduced in the workpiece 12 (see FIG. 6). Strictly speaking, the scoring groove is not a groove, but only a scoring channel 52'.

Figure 7:
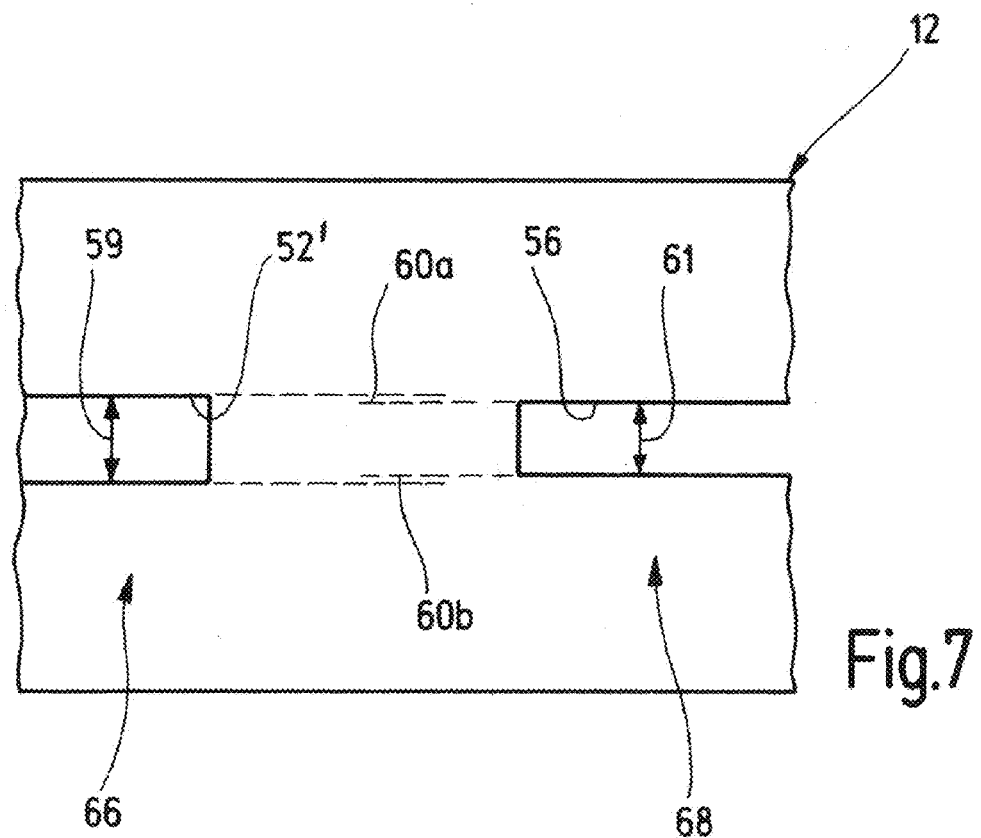
FIG. 7 is an illustration similar to FIG. 2 with separate scoring and separating grooves.

An additional procedure is apparent from FIG. 7. With this procedure, the scoring groove 52 and separating groove 56 are emplaced separately from each other in different locations, which is to say not in an overlapping manner, in the workpiece 12. Again, strictly speaking, the scoring groove is not a groove, but only a scoring channel 52'. The scoring channel 52' and separating groove 56 are then measured by the video camera 40 by means of image processing and the actual relative position is determined. For the automatic adjustment of the scorer blade 30 in relation to the cutoff saw blade 24, the image detection device 40, 46 transmits the variances 60*a* and 60*b* between the scoring channel 52' and the separating groove 56 to the controller 47. The controller then positions the scoring blade 30 by means of the adjusting device 36, so that the blade is aligned with the cutoff saw blade 24.

Of course, in all embodiments, based on the image detection device 40, 46 the width of the scoring groove 52 or 52' can also be adjusted and optimized, for example, if the scorer blade 30 is conical and can be displaced perpendicular to the plane of the workpiece 12.

In the embodiments described above, in each case a separating groove 56 is produced, the depth 58 of which corresponds to the thickness of the workpiece 12. However, it is also possible that the cut of the cutoff saw 24 has only one depth 58', which is less than the thickness of the workpiece 12. The cut thus does not result in a separating groove, but only in a separating channel 56'. This is shown by way of example in dash-dotted fashion in FIG. 5, however, it can also be used in all other embodiments as well.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A sawing device comprising:
a cutoff saw;
a scorer positioned in front of the cutoff saw;
a remote controlled adjusting device for adjusting the position of the scorer transversely to a sawing direction and transversely to a plane of the scorer;
an acquisition device, which on a processed workpiece acquires measurements of at least one of:
an actual relative position of a scoring groove produced by the scorer to a separating groove produced by the cutoff saw; and
stripping of the separating groove,
wherein the acquisition device comprises an evaluation device, which evaluates the strippping; and
a controller that receives signals from the acquisition device and adjusts the scorer relative to the cutoff saw based on at least one of the acquired position and stripping measurements.

2. The sawing device according to claim 1, characterized in that the acquisition device comprises image capturing.

3. The sawing device according to claim 1, characterized in that the acquisition device comprises a laser scanning device.

4. The sawing device according to claim 1, characterized in that the acquisition device comprises an ultrasonic scanning device.

5. The sawing device according to claim 1, characterized in that the acquisition device comprises a monitor, on which the relative position of the scoring groove to the separating groove can be visualized.

6. The sawing device according to claim 1, characterized in that the sawing device has a controller, which controls the adjusting device and thereby automatically adjusts the acquired actual relative position to a target relative position.

7. The sawing device according to claim 1, characterized in that the controller controls the adjusting device and thereby automatically adjusts the acquired actual relative position so that stripping of the separating groove is reduced.

8. The sawing device according to claim 1, characterized in that the cutoff saw and/or the scorer and at least a part of the acquisition device are disposed on a common traveler.

9. The sawing device according to claim 1, characterized in that at least a part of the acquisition device is disposed on a separate displaceable cart.

10. The sawing device according to claim 1, characterized in that the acquisition device acquires the scoring groove and the separating groove in a plane that is orthogonal to the sawing direction.

11. The sawing device according to claim 1, characterized in that the acquisition device acquires a top view of a region of the scoring groove and of the separating groove on the processed workpiece.

12. The sawing device according to claim 1, characterized in that the evaluation device evaluates undulated cuts.

* * * * *